(12) United States Patent
Oliveira et al.

(10) Patent No.: US 7,561,696 B2
(45) Date of Patent: Jul. 14, 2009

(54) DELIVERING POLICY UPDATES FOR PROTECTED CONTENT

(75) Inventors: Eduardo P. Oliveira, Redmond, WA (US); James M. Alkove, Woodinville, WA (US); Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 45 days.

(21) Appl. No.: 11/179,206

(22) Filed: Jul. 12, 2005

(65) Prior Publication Data

US 2007/0014413 A1 Jan. 18, 2007

(51) Int. Cl.
- H04L 9/00 (2006.01)
- H04L 9/08 (2006.01)
- G06F 7/04 (2006.01)
- G06F 17/30 (2006.01)
- H04N 7/16 (2006.01)
- G06F 11/30 (2006.01)
- G06F 12/14 (2006.01)
- G06F 21/00 (2006.01)

(52) U.S. Cl. .......... 380/278; 726/27; 726/28; 726/29; 726/30; 705/51; 713/193; 380/277; 380/281; 380/284

(58) Field of Classification Search .......... 380/278
See application file for complete search history.

(56) References Cited

U.S. PATENT DOCUMENTS

| | | |
|---|---|---|
| 6,654,389 B1 | 11/2003 | Brunheroto et al. |
| 6,856,997 B2 | 2/2005 | Lee et al. |
| 6,918,034 B1 | 7/2005 | Sengodan et al. |
| 6,983,049 B2 | 1/2006 | Wee et al. |
| 6,993,137 B2 | 1/2006 | Fransdonk |
| 7,010,032 B1 | 3/2006 | Kikuchi et al. |
| 7,080,043 B2 | 7/2006 | Chase, Jr. et al. |
| 7,120,250 B2 | 10/2006 | Candelore |
| 7,136,945 B2 | 11/2006 | Gibbs et al. |
| 7,145,919 B2 | 12/2006 | Krishnarajah et al. |
| 7,174,452 B2 | 2/2007 | Carr |
| 7,243,366 B2 | 7/2007 | Medvinsky et al. |
| 7,325,139 B2 | 1/2008 | Ishiguro et al. |
| 2002/0002674 A1 | 1/2002 | Grimes et al. |

(Continued)

FOREIGN PATENT DOCUMENTS

EP 1041823 10/2000

(Continued)

OTHER PUBLICATIONS

Curet, et al., "RTP Payload Format for MPEG-4 FexMultiplexed Streams", Internet Engineering Task Force, Internet Draft, XP-001075015, Nov. 8, 2001, 12 pages.

(Continued)

*Primary Examiner*—Shin-Hon Chen
(74) *Attorney, Agent, or Firm*—Lee & Hayes, PLLC (57) ABSTRACT

Various embodiments permit policy updates, such as DRM policy updates, to be delivered and updated for a given piece of protected content. In at least some embodiments, various protocols can be extended to permit policy updates to be represented and carried by the protocol. In one embodiment, Hypertext Transport Protocol or HTTP is utilized to carry the policy updates. In another embodiment, Real Time Streaming Protocol or RTSP is used to carry policy updates.

11 Claims, 9 Drawing Sheets

U.S. PATENT DOCUMENTS

| | | | |
|---|---|---|---|
| 2002/0004773 A1 | 1/2002 | Xu et al. | |
| 2003/0041257 A1 | 2/2003 | Wee et al. | |
| 2003/0056118 A1 | 3/2003 | Troyansky et al. | |
| 2003/0081592 A1 | 5/2003 | Krishnarajah et al. | |
| 2003/0131353 A1 | 7/2003 | Blom et al. | |
| 2003/0161473 A1* | 8/2003 | Fransdonk | 380/277 |
| 2004/0042451 A1 | 3/2004 | Takaku | |
| 2004/0125757 A1 | 7/2004 | Mela et al. | |
| 2004/0125791 A1 | 7/2004 | Hoffmann | |
| 2004/0143736 A1 | 7/2004 | Cross et al. | |
| 2004/0249759 A1 | 12/2004 | Higashi et al. | |
| 2005/0002525 A1 | 1/2005 | Alkove et al. | |
| 2005/0008240 A1 | 1/2005 | Banerji et al. | |
| 2005/0069039 A1 | 3/2005 | Crinon | |
| 2005/0163052 A1 | 7/2005 | Savage et al. | |
| 2005/0169444 A1 | 8/2005 | Inon | |
| 2005/0177875 A1 | 8/2005 | Kamperman et al. | |
| 2005/0254526 A1 | 11/2005 | Wang et al. | |
| 2005/0265555 A1* | 12/2005 | Pippuri | 380/284 |
| 2006/0104356 A1 | 5/2006 | Crinon | |
| 2006/0161635 A1 | 7/2006 | Lamkin et al. | |
| 2006/0167985 A1 | 7/2006 | Albanese et al. | |
| 2006/0184790 A1 | 8/2006 | Oliveira et al. | |
| 2006/0268099 A1 | 11/2006 | Potrebic et al. | |
| 2007/0003064 A1* | 1/2007 | Wiseman et al. | 380/281 |
| 2007/0016594 A1 | 1/2007 | Visharam et al. | |
| 2007/0016784 A1 | 1/2007 | Vauclair | |
| 2007/0171903 A1 | 7/2007 | Zeng et al. | |
| 2007/0274393 A1 | 11/2007 | Toma et al. | |
| 2008/0075168 A1 | 3/2008 | Toma et al. | |
| 2008/0187284 A1 | 8/2008 | Ikeda et al. | |

FOREIGN PATENT DOCUMENTS

| | | |
|---|---|---|
| EP | 1494425 | 1/2005 |
| WO | WO2004023717 | 3/2004 |
| WO | WO2004030364 | 4/2004 |

OTHER PUBLICATIONS

Handley, et al., "SDP: Session Description Protocol," The Internet Society, 1998, pp. 1-42.

Klemets, "RTP Payload Format for Video Codec 1 (VC-1)," Microsoft, Feb. 2006, pp. 1-36.

Mehaoua et al, "RTP4mux: A Novel MPEG-4 RTP Payload for Multicast Video Communications over Wireless IP", Retrieved from the Internet Mar. 22, 2005: URL: http//www.polytech.uiv-nantes. PDF.

Proposed SMPTE Standard for Television: VC-1 Compressed Video Bitstream "Format and Decoding Process," The Society of Motion Picture and Television Engineers, Aug. 23, 2005, pp. 1-480.

"RTP Profile for Audio and Video Conferences with Minimal Control", RFC 1890, available at [[http://faqs.org/rfcs/rfc1890.html]], accessed Jan. 7, 2004, 14 pages.

Schulzrinne, et al., "RTP: A Transport Protocol for Real-Time Applications," The Internet Society, 2003, pp. 1-104.

"RTP Payload Format for MPEG-4 Streams," Internet Engineering Task Force, Internet Draft, XP-001033580, Jul. 2001, 41 pages.

"SMPTE Standard for Television, Audio and Film—Time and Control Code", The Society of Motion Picture and Television Engineers, Sep. 12, 1995.

Won-Ho Kim, "Design and Implementation of MPEG-2/DVB Scrambler Unit and VLSI Chip" 1997 International Conference on Consumer Electronics vol. 43 No. 3. pp. 320-321 Jun. 1997.

Search Report and Written Opinion in PCT/US2006/031185, date of mailing Jan. 16, 2007, p. 12.

* cited by examiner

DELIVERING POLICY UPDATES FOR PROTECTED CONTENT

BACKGROUND

Digital Rights Management (DRM) refers to techniques that are used to protect content, such as by controlling or restricting the use of digital media content on electronic devices. One characteristic of DRM is that it can bind the media content to a given machine or device. Thus, a license that pertains to a particular piece of content and which defines rights and restrictions associated with the piece of content will typically be bound to the given machine or device. As a result, a user will not typically be able to take the piece of content and move it to another machine in order to playback the content.

Another characteristic of some DRM-protected content is that some content types, such as ASF files, allow only one set of rights and restrictions, i.e. "policies", to apply to the entire file. For example, when a video file is rendered, either Macrovision may be required to be enabled on an analog video output for the whole file, or it may not be required at all. With these particular types of files, one cannot change the policies associated with the content in the middle of the file or midstream.

SUMMARY

Various embodiments permit policy updates, such as DRM policy updates, to be delivered and updated for a given piece of protected content. In at least some embodiments, various protocols can be extended to permit policy updates to be represented and carried by the protocol. In one embodiment, Hypertext Transport Protocol or HTTP is utilized to carry the policy updates. In another embodiment, Real Time Streaming Protocol or RTSP is used to carry policy updates.

DETAILED DESCRIPTION

Overview

Various embodiments permit policy updates, such as DRM-policy updates, to be delivered and updated for a given piece of protected content. In at least some embodiments, various protocols can be extended to permit policy updates to be represented and carried by the protocol. In one embodiment, Hypertext Transport Protocol or HTTP is utilized to carry the policy updates. In another embodiment, Real Time Streaming Protocol or RTSP is used to carry policy updates.

In the discussion that follows, a section entitled "Content Security and License Transfer Protocol" is provided and describes one particular system in which the inventive techniques can be employed. Following this, a section entitled "RTSP" is provided to give the reader who is unfamiliar RTSP at least some context for understanding the inventive techniques in the RTSP space.

Following this section, a section entitled "Chaining Licenses For Delivering Updated Policies" is provided and describes the notion of chaining licenses and how chained licenses can be utilized in the inventive context. Following this section, a section entitled "Delivering Updated Policies Using HTTP" is provided and describes how chained licenses can be used in the context of HTTP to deliver policy updates. After this section, a section entitled "Using RTSP To Carry Root and Leaf Licenses" is provided and describes how chained licenses can be used in the context of RTSP to deliver policy updates.

Content Security and License Transfer Protocol

The following provides a discussion of an exemplary protocol which provides security and transfers licenses for content flowing over digital links. This protocol constitutes but one exemplary protocol with which the various inventive techniques can be employed. It is to be appreciated and understood that other protocols can be utilized without departing from the spirit and scope of the claimed subject matter.

The following cryptographic notation is used in this description:

| | |
|---|---|
| K{data} | data is encrypted with secret key K. |
| K[data] | data is signed with secret key K. |
| {data}$_{Device}$ | data is encrypted with the device's public key. |
| [data]$_{Device}$ | data is signed with the device's private key. |

In this particular protocol, there are five primary procedures: Registration, Revalidation, Proximity Detection, Session Establishment, and Data Transfer.

In the Registration procedure, a transmitter (i.e. a device that has content that is to be transmitted to another device) can uniquely and securely identify an intended receiver (i.e. a device to which content is to be transmitted). In this particular protocol, the transmitter maintains a database with registered receivers and ensures that no more than a small predetermined number of receivers are used simultaneously. During the registration process, the transmitter also employs a Proximity Detection procedure to ensure that the receiver is located "near" the transmitter in the network, in order to prevent wide distribution of protected content.

The Revalidation procedure is utilized to ensure that the receiver continues to be "near" the transmitter. Content is not delivered to receivers unless they have been registered or revalidated within a predetermined period of time in the past.

The Session Establishment procedure is used whenever the receiver requests content from the transmitter. The transmitter enforces that devices must be registered and recently validated before the Session Establishment can be completed.

Once the session is established, the Data Transfer of the requested content can take place in a secure way. The receiver may reuse the session to retrieve specific portions of the content (seeking), but must establish a new session in order to retrieve a different content.

Figure 1:
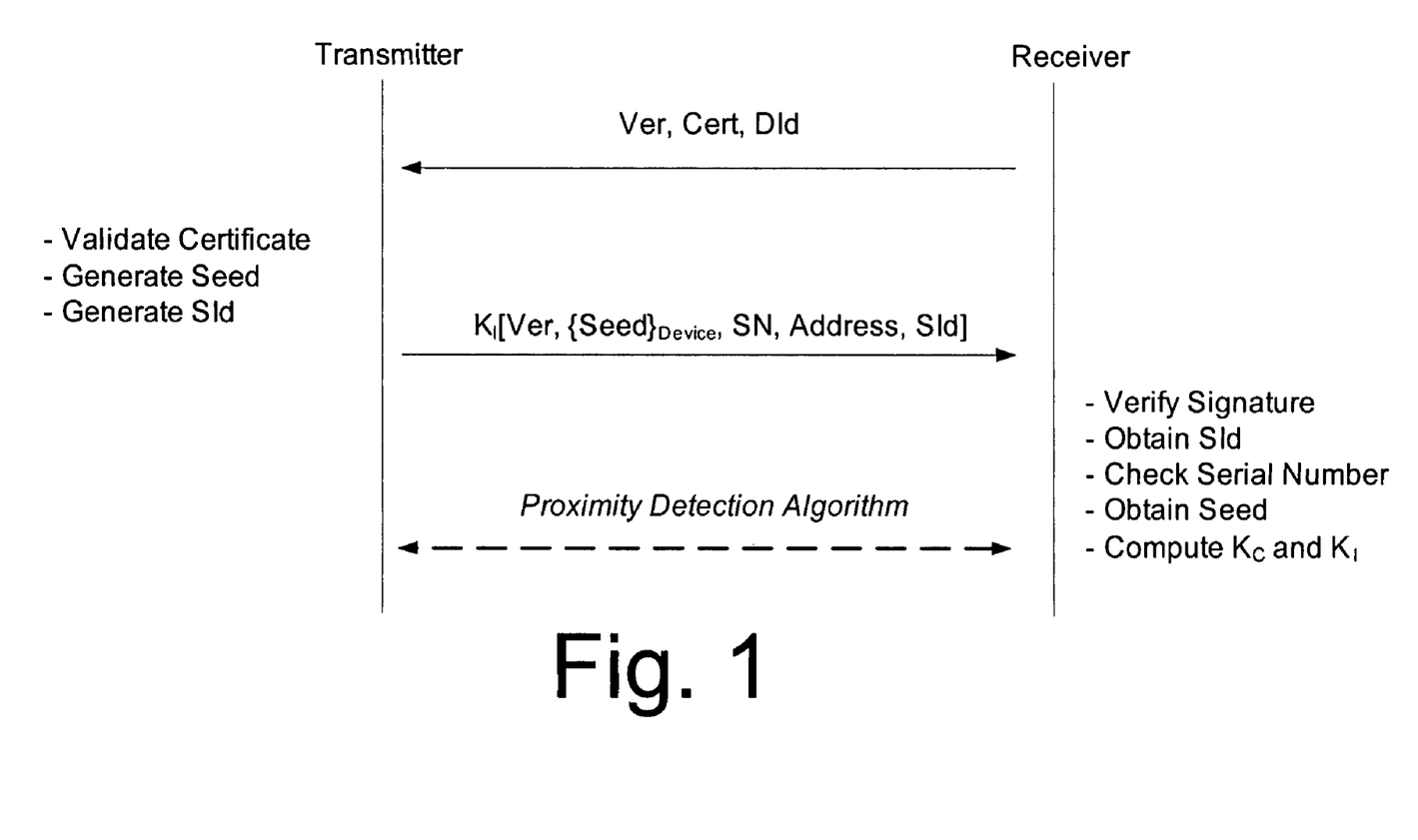
FIG. 1 illustrates an exemplary registration procedure of a protocol with which the inventive embodiments can be employed in one embodiment.

Consider now the Registration procedure in connection with FIG. 1 and the table just below that describes the various messages that are passed between the transmitter and the receiver during registration.

| Message | Value | Description |
|---|---|---|
| Registration Request Message | Ver | 8-bit Protocol Version |
| | Cert | XML digital certificate of the Receiver. |
| | DId | 128-bit Serial Number. |
| Registration Response Message | Ver | 8-bit Protocol Version |
| | { Seed }Device | 128-bit Seed used to derive the Content Encryption key and Content Integrity key. |
| | SN | 128-bit Serial Number. |
| | Address | Address of transmitter's incoming and outgoing proximity packets socket. |
| | SId | 128-bit Random Session Id. |
| Proximity Detection Algorithm | | The Proximity Detection Algorithm is executed out-of-band. |

Here, the receiver sends a registration request message that contains, among other information, the receiver's digital certificate. Responsive to receiving the registration request message, the transmitter validates the receiver's certificate, generates a seed and a random session ID, returning the same in the form indicated above to the receiver in a registration response message. The receiver then validates the transmitter's signature, obtains the session ID and performs the other actions indicated in the figure. The receiver and the transmitter can then undergo a proximity detection process which is described below.

With regard to Revalidation, the same procedures as outlined above are performed, with the difference being that during Revalidation, the receiver is already registered in the database.

Figure 2:
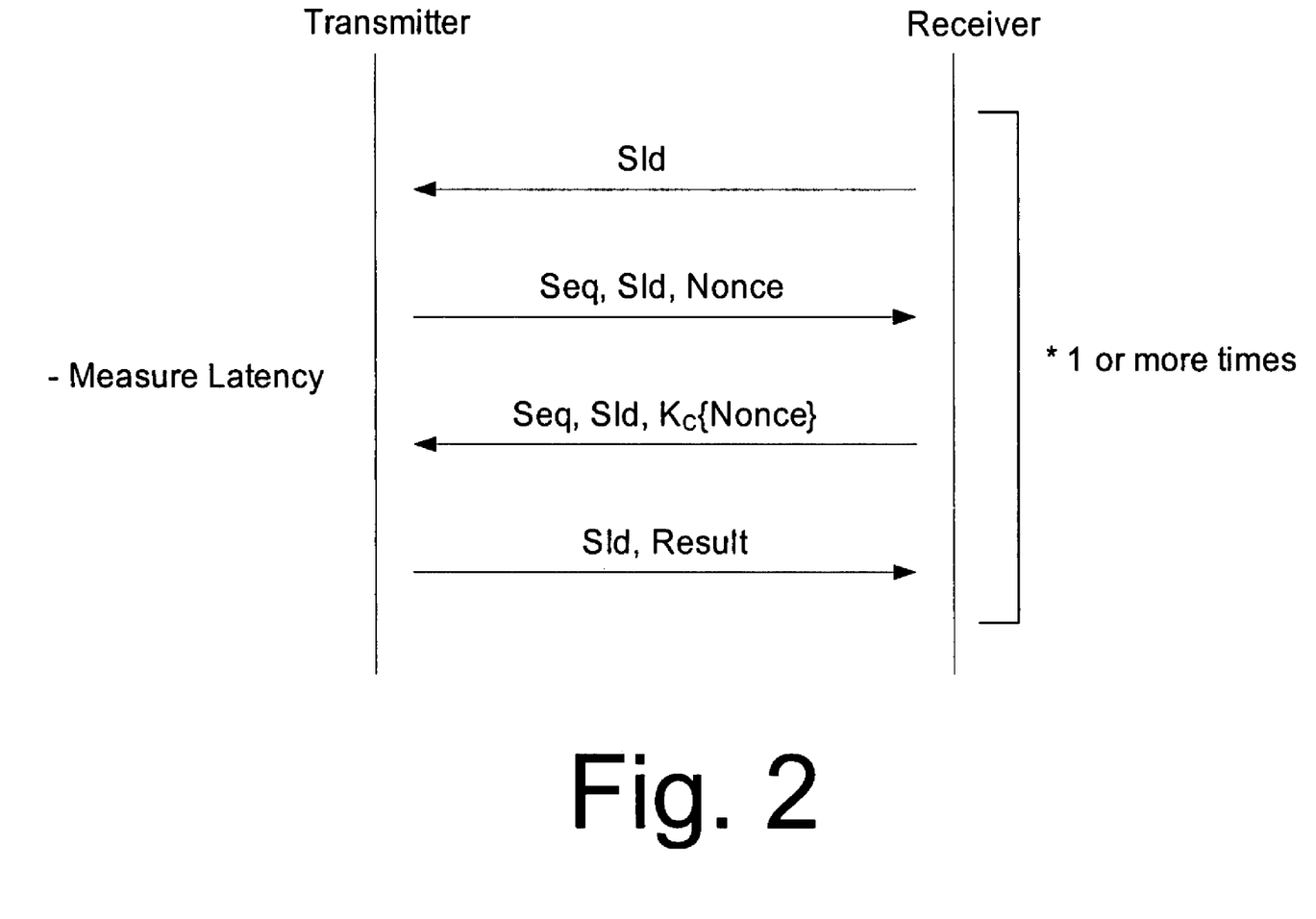
FIG. 2 illustrates an exemplary proximity detection procedure of a protocol with which the inventive embodiments can be employed in one embodiment.

With regard to Proximity Detection, consider the following in connection with FIG. 2.

During the Proximity Detection procedure, the receiver sends to the transmitter a message containing the Session Id indicated in a Proximity Detection Initialization Message. The transmitter then sends to the receiver a message containing a Nonce (128-bit random value), and measures the time it takes for the receiver to reply with the nonce encrypted using a Content Encryption key. Finally, the transmitter sends a message to the receiver indicating if the proximity detection was successful or not.

The receiver may repeat the process until it has a confirmation that the proximity detection succeeded. When this particular protocol is used over IP-based networks, the proximity detection messages are exchanged over UDP. The receiver learns the transmitter's address via the Registration Response message. The receiver's address does not need to be separately communicated since it can be determined by inspecting the incoming IP header of the UDP packet that carries the Proximity Detection Initialization Message.

The following table describes the messages that are exchanged during Proximity Detection:

| Message | Value | Description |
|---|---|---|
| Proximity Start Message | SId | Same 128-bit Session Id value sent by the transmitter. |
| Proximity Challenge Message | Seq | 8-bit incremental sequence number. |
| | SId | Same 128-bit Session Id. |
| | Nonce | 128-bit Random Value. |
| Proximity Response Message | Seq | Same sequence number determined by the transmitter. |
| | SId | Same 128-bit Session Id. |
| | KC {Nonce} | 128-bit Nonce encrypted using the Content Encryption key. |
| Proximity Result Message | SId | Same 128-bit Session Id. |
| | Result | Status code indicating the success or failure of the registration procedure. |

Figure 3:
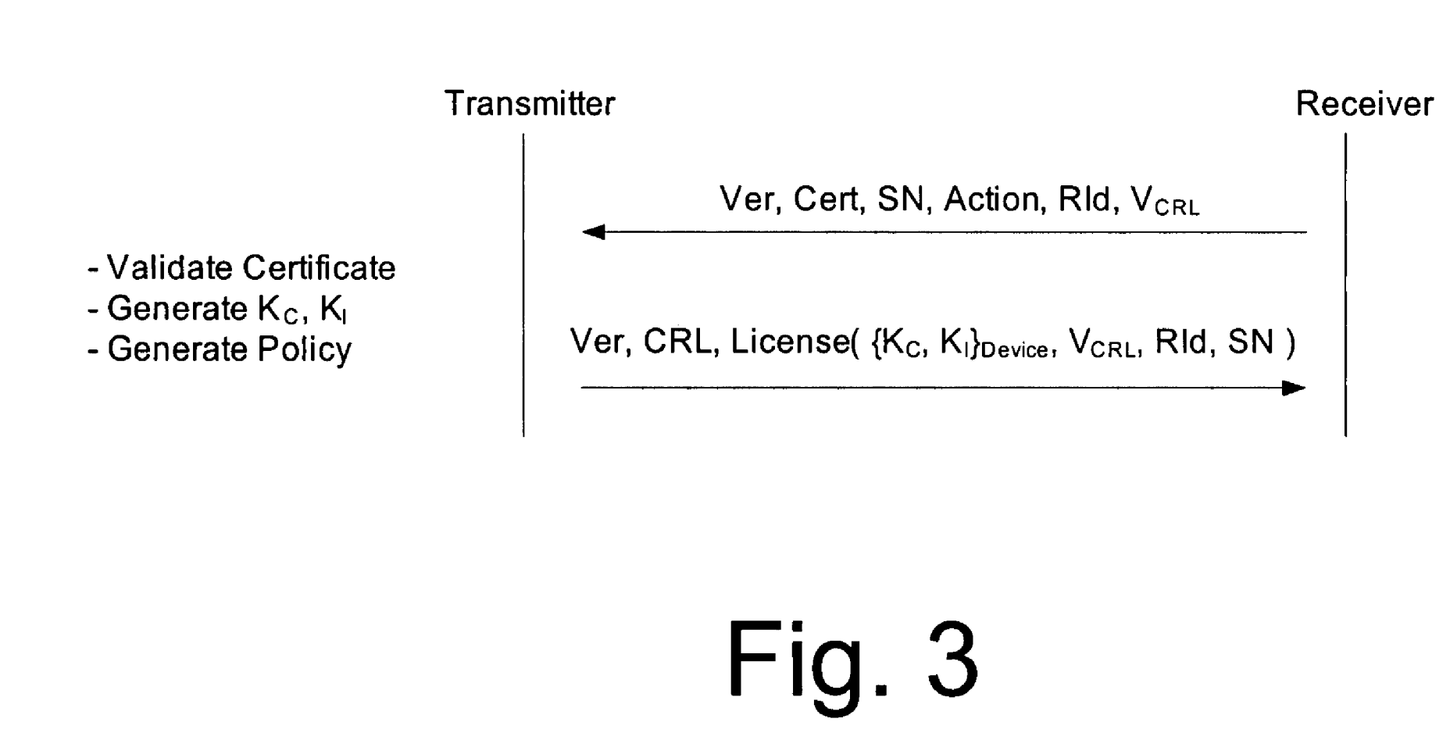
FIG. 3 illustrates an exemplary session establishment procedure of a protocol with which the inventive embodiments can be employed in one embodiment.

With regard to Session Establishment, consider the following in connection with FIG. 3 and the table just below which describes messages that are exchanged during Session Establishment.

| Message | Value | Description | |
|---|---|---|---|
| License Request Message | Ver | 8-bit Protocol Version | |
| | Cert | XML digital certificate of the Receiver. | |
| | SN | 128-bit Serial Number. | |
| | Action | Requested usage for the content. Ex.: "Play", "Copy" or "Burn". | |
| | RId | 128-bit random Rights Id. | |
| | VCRL | Version of the receiver's CRL. | |
| License Response Message | Ver | 8-bit Protocol Version | |
| | CRL | Transmitter's CRL. Only sent in case it has a higher version number than the receiver's CRL and the receiver component also has transmitting capabilities. | |
| | License | KC (encrypted with receiver's public key) | 128-bit Random Content Encryption key. |
| | | KI (encrypted with receiver's public key) | 128-bit Random Content Integrity key. |
| | | VCRL | Version of the |

-continued

| Message | Value | Description |
|---|---|---|
| | | transmitter's CRL. |
| | RId | Same 128-bit random Rights Id sent by the receiver. |
| | SN | 128-bit Serial Number. |

In this example, a License Request Message is sent from the receiver to the transmitter and contains the information described above. In response, the transmitter can send a License Response Message that contains the information described above.

In this particular example, the License is represented in XMR format and includes a Content Encryption key, a Content Integrity key, a Version of the Transmitter's CRL, a 128-bit Rights Id and a 128-bit Serial Number. The License also contains an OMAC calculated using the Content Integrity key using OMAC.

Figure 4:
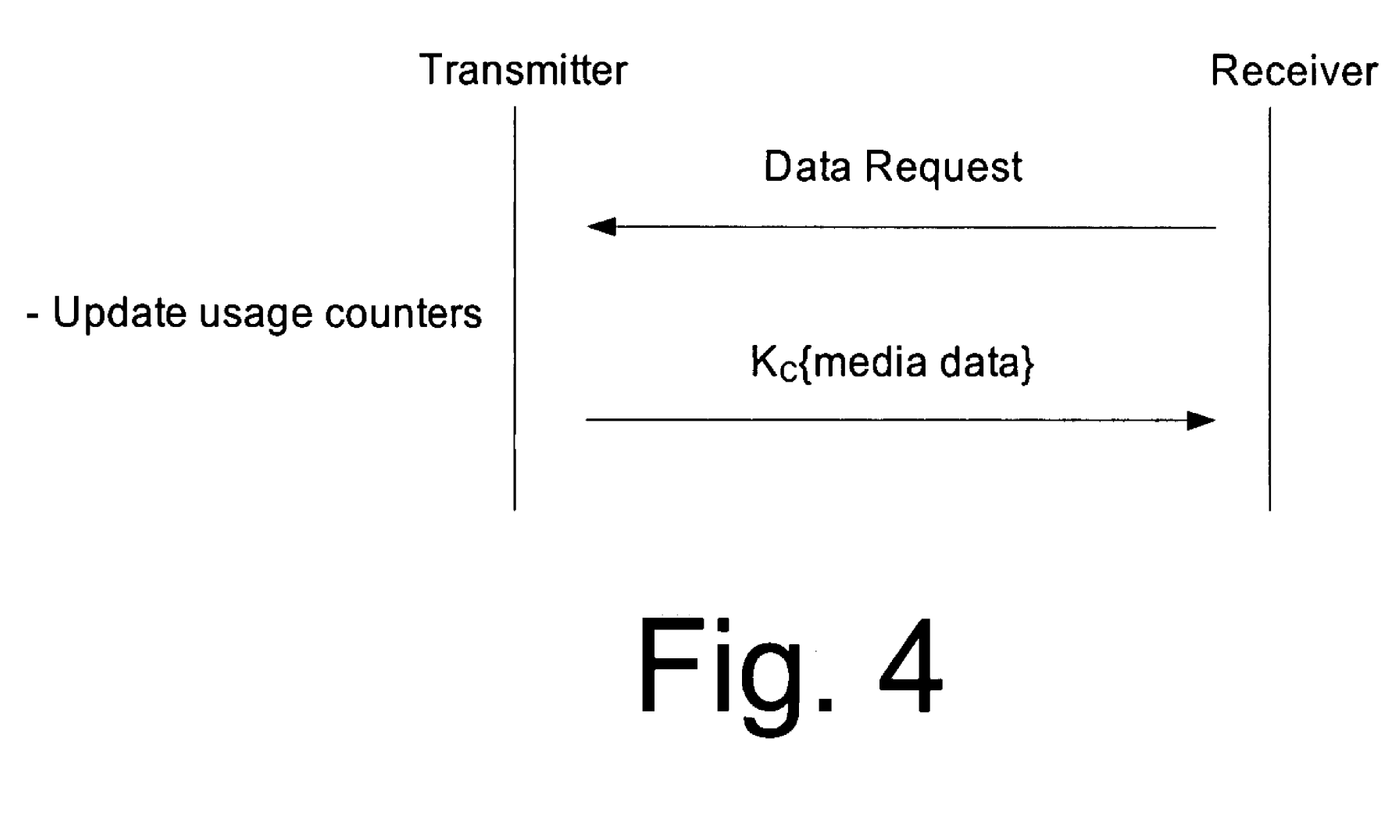
FIG. 4 illustrates an exemplary data transfer procedure of a protocol with which the inventive embodiments can be employed in one embodiment.

With regard to the Data Transfer procedure, consider the following in connection with FIG. 4. Once the Session Establishment is complete, the data transfer is executed in a control protocol specific manner. Both the Data Transfer request and response must be specifically defined for the control protocol and content type. This is conceptually represented in FIG. 4.

Having now provided a brief overview of an exemplary protocol with which the inventive embodiments can be employed, consider now some background information on RTSP.

RTSP

The Real Time Streaming Protocol or RTSP is an application-level protocol for control over the delivery of data with real-time properties (i.e. streaming), as will be appreciated by the skilled artisan. RTSP provides an extensible framework to enable controlled, on-demand delivery of real-time data, such as audio and video. Sources of data can include both live data feeds and stored clips. This protocol is intended to control multiple data delivery sessions, provide a means for choosing delivery channels such as UDP, multicast UDP and TCP, and provide a means for choosing delivery mechanisms based upon RTP.

RTSP establishes and controls either a single or several time-synchronized streams of continuous media such as audio and video. It does not typically deliver the continuous streams itself, although interleaving of the continuous media stream with the control stream is possible. In other words, RTSP acts as a "network remote control" for multimedia servers.

The set of streams to be controlled is defined by a presentation description. In RTSP, there is no notion of an RTSP connection; instead, a server maintains a session labeled by an identifier. An RTSP session is in no way tied to a transport-level connection such as a TCP connection. During an RTSP session, an RTSP client may open and close many reliable transport connections to the server to issue RTSP requests. Alternatively, it may use a connectionless transport protocol such as UDP, as will be appreciated by the skilled artisan.

The streams controlled by RTSP may use RTP, but the operation of RTSP does not depend on the transport mechanism used to carry continuous media.

Figure 5:
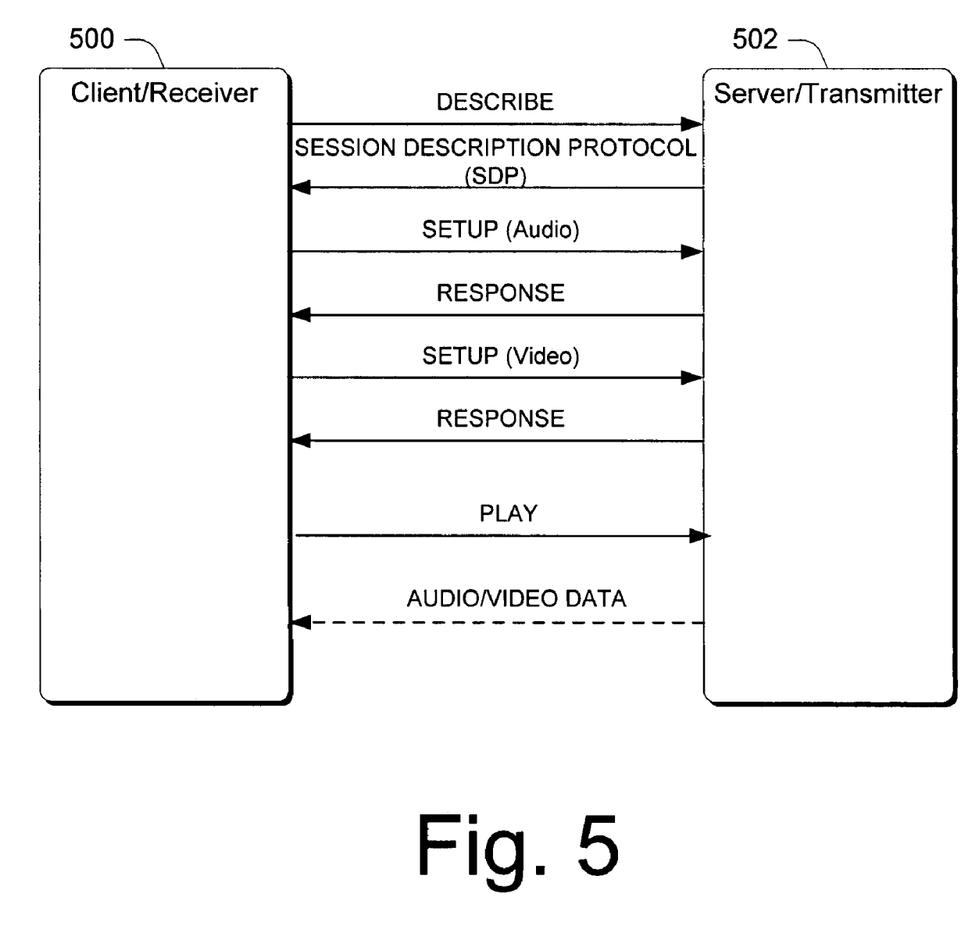
FIG. 5 illustrates aspects of a streaming protocol with which the inventive embodiments can be utilized in accordance with one embodiment.

Consider now a typical RTSP request/response exchange in connection with FIG. 5, between a client/receiver 500 and a server/transmitter 502.

Preliminarily, the RTSP requests/responses have headers which, for the sake of brevity, are not described. In RTSP, a client/receiver 500 typically issues what is known as a DESCRIBE request which is directed to retrieving a description of a presentation or media object identified by a request URL from server 502. The server 502 responds with a description of the requested resource which is represented in the SESSION DESCRIPTION PROTOCOL (SDP). The DESCRIBE response (SDP) contains all media initialization information for the resource(s) that it describes.

Next, client 500 sends a SETUP request for a URI that specifies the transport mechanism to be used for the streamed media. In the FIG. 5 example, a SETUP request is sent for both audio and video. Client 500 also indicates, in the SETUP request, the transport parameters that it will be utilizing. A transport header in the SETUP request specifies the transport parameters acceptable to the client for data transmission. The RESPONSE from server 502 contains the transport parameters selected by the server. The server also generates session identifiers in response to the SETUP requests.

At this point, the client can issue a PLAY request which tells the server to start sending data via the mechanism specified in the SETUP. Responsive to receiving a PLAY request, the server can start streaming the content which, in this example, is the audio/video content. In this example, the streaming content is encapsulated using RTP packets and is sent over UDP, as will be appreciated by the skilled artisan.

The RTSP protocol has other methods of interest which include PAUSE, TEARDOWN, GET_PARAMETER, SET_PARAMETER, REDIRECT, and RECORD. For additional background on RTSP, the reader should consult the RTSP RFC, Schulzrinne, H., Rao, A., and R. Lanphier, "Real Time Streaming Protocol (RTSP)", RFC 2326, available at http://www.ietf.org/rfc/rfc2326.txt, April 1998.

Chaining Licenses For Delivering Updated Policies

In the illustrated and described embodiment, the notion of license chaining is utilized in the policy update process. In this particular embodiment, the notion of a root license and a leaf license is employed. Here, the root license is utilized to set up and securely deliver a content key to the client/receiver so that the client/receiver can decrypt subsequently-delivered policy updates using the content key. Once the initial content key is securely delivered to the client/receiver, subsequent content keys can be encrypted by the server/transmitter using the initially-delivered content key and sent to the client/receiver. Using the initially-delivered content key, the client can decrypt the associated policy updates.

Figure 6:
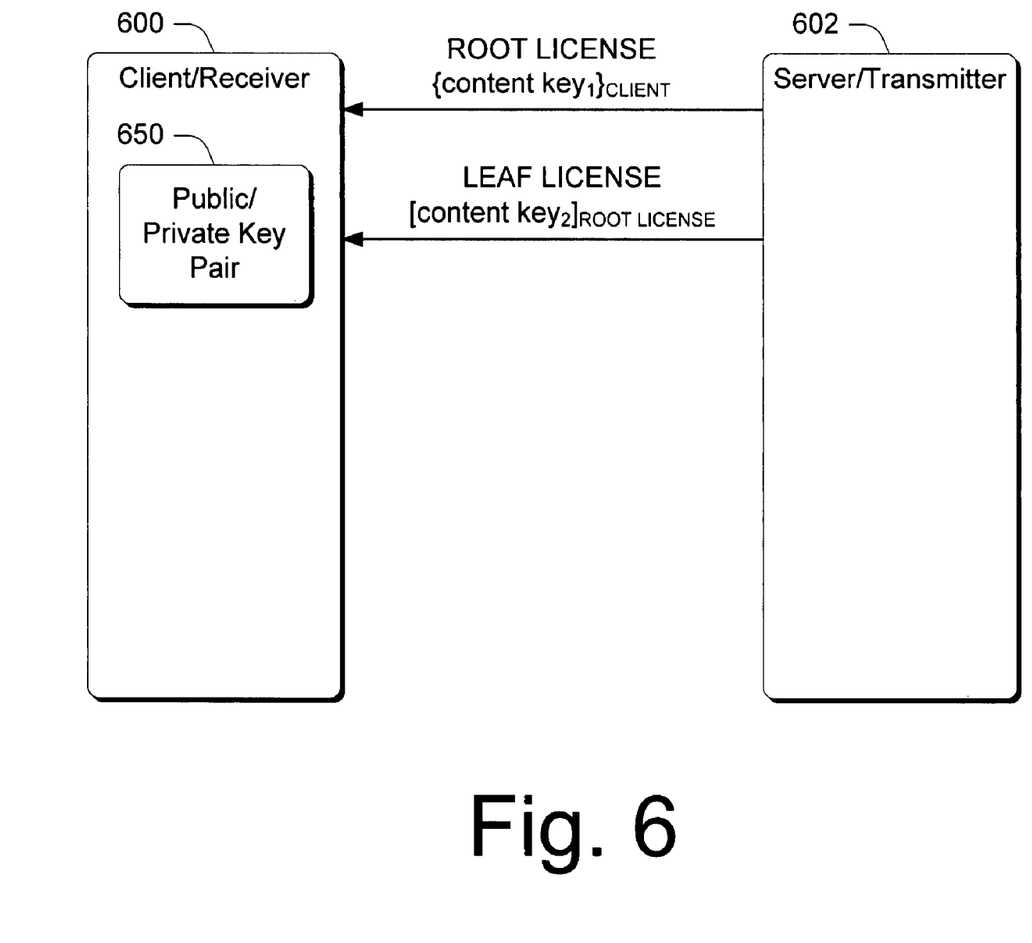
FIG. 6 illustrates aspects associated with root licenses and leaf licenses, in accordance with one embodiment.

To provide but one example of how this particular scheme can be implemented, consider the following in connection with FIG. 6. In this particular example, the system of FIG. 6 is configured to use 1024-bit RSA keys for public key cryptographic operation and 128-bit AES keys for symmetric cryptographic operations. Of course, this is provided as but one example and is not intended to limit application of the claimed subject matter.

In this example, client/receiver 600 has a public/private key pair 650 and the server/transmitter 602 has the client/receiver's public key. In this example, each of the client/receiver's public and private keys is a 1024-bit RSA key. Using the client/receiver's public key, the server/transmitter builds a root license that contains an initial content key that is encrypted with the client/receiver's public key. The initial content key is a 128-bit AES content key. This root license is then sent to the client/receiver. In FIG. 6, this is shown as the first communication that takes place between the client/receiver and server-transmitter, where the encrypted content key is represented as $\{\text{content key}_1\}_{CLIENT}$. It is to be appreciated, however, that other communication prior to the illustrated communication can take place.

Having received the encrypted content key from the server/transmitter, the client/receiver can now decrypt the content key using its private key and can securely store the decrypted content key for future use. In the description that follows, this first content key is referred to as the initial content key.

At this point, consider what has occurred. The server/transmitter has securely communicated a key to the client/receiver that can now serve as the basis for subsequent cryptographic operations. More specifically, consider now that a policy update is to be made pertaining to a particular piece of DRM-protected content during streaming. In this case, the server/transmitter can prepare a leaf license that contains the updated policy. This leaf license contains policy updates and an encrypted version of content key$_2$. In this example, content key$_2$ is a 128-bit AES content key that has been encrypted using the initial content key. Thus, the computational complexity and expense experienced and incurred by the client/receiver associated with decrypting new and additional content keys is reduced over that associated with 1024-bit RSA key operations because now, the client/receiver only needs to decrypt using a 128-bit AES content key (i.e. the initial content key).

For an implementation example in which XMR is utilized to represent a license and a license update, consider the following.

One purpose of using license chaining is to reduce the number of asymmetric key operations performed during license updates. In this implementation example, no emphasis is placed on utilizing root licenses as a mechanism for conveying rights and restrictions. As a result, root licenses are very simple and convey no rights or restrictions. It is to be appreciated, however, that the root license may carry with it, in at least some implementations, rights and restrictions.

In this example, the leaf licenses are linked to the root license via an Uplink KID Object. The following sections highlight the objects that are present in these licenses, in accordance with one embodiment.

With regard to root licenses, the following describes a set of XMR objects that are present on a root license for Playback.

The Playback Policy Container Object must be present in order to allow Playback to occur. A Root license for a Copy action, on the other hand, should contain a Copy Right Container Object instead of a Playback Policy Container.

The following is a set of XMR objects that are present on a Root license for Copy.

In this embodiment, the Copy Right Container Object must be present in order to indicate that Copy is allowed. Notice that the Playback Policy Container Object is still present, since the right to Playback must always be granted.

With regard to leaf licenses in this particular embodiment, consider the following. Leaf licenses can contain any type of rights or restrictions that can be expressed via XMR. The main difference between a leaf license from a chain and a non-chained license lies in the usage of a symmetric key to encrypt the content key and its link up to another license via the Uplink KID Object.

The following is an example of a Leaf license for playback:

The Content Key Object must have the Key Encryption Cipher Type set to 0x0002 (Chained License) and the Symmetric Cipher Type set to 0x0001 (AES CTR). The Uplink KID object must have the Uplink KID field set to the KID of the Root license.

The following is an example of a Leaf license for copy, in this particular embodiment:

In this embodiment, the Copy Right Container Object must be present in order to indicate that Copy is allowed. The Copy Count Restriction Object is present if there are limits to the number of copies that are allowed. The Copy Protection Level Restriction Object is present if there are restrictions on the systems used as the destination for the copy. Notice that the Playback Policy Container Object is still present, since the right to Playback must always be granted.

Figure 7:
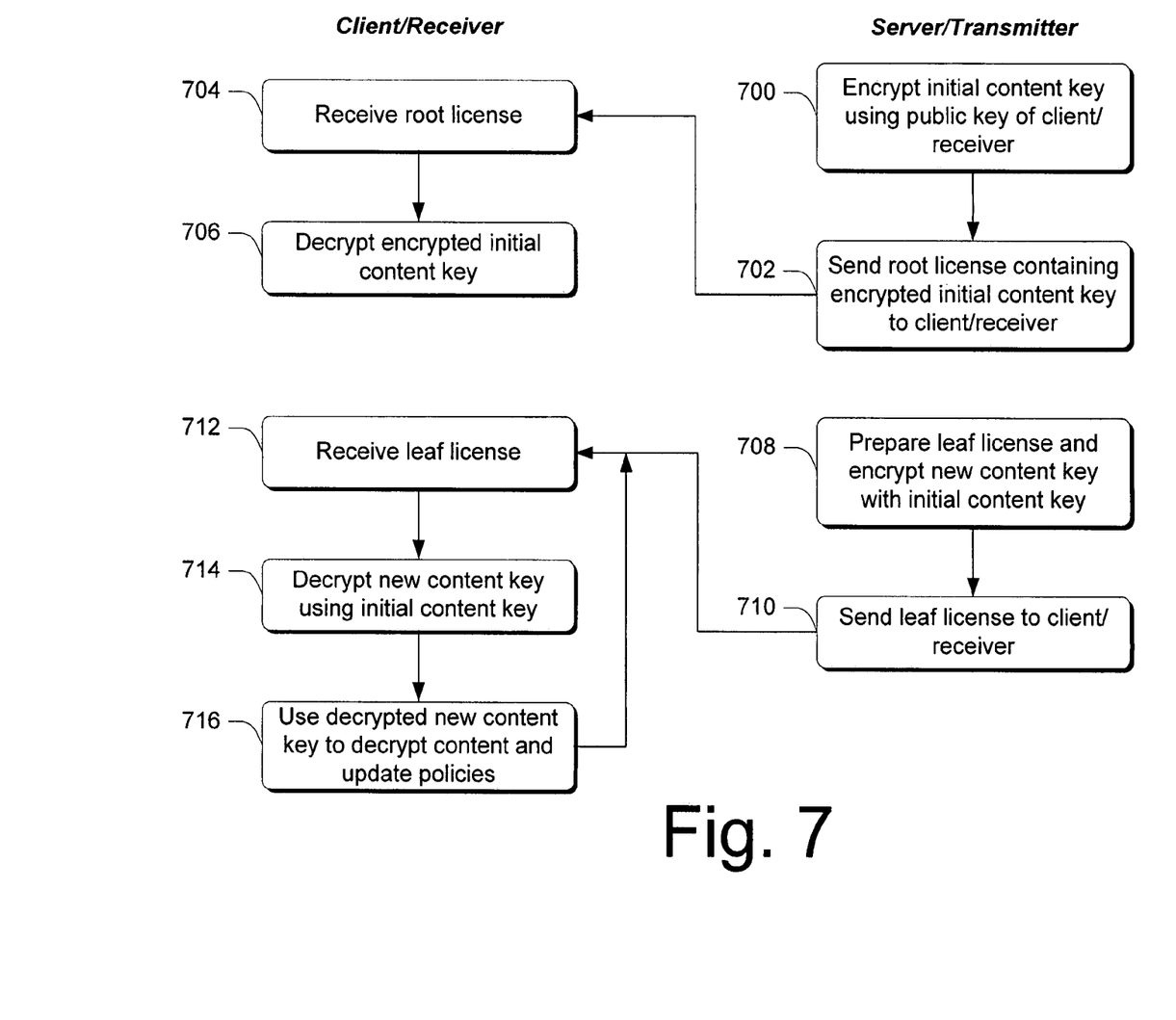
FIG. 7 is a flow diagram that describes steps in a method in accordance with one embodiment.

FIG. 7 is a flow diagram that describes steps in a method in accordance with one embodiment. This method can be performed in connection with any suitable hardware, software, firmware or combination thereof. In one embodiment, the method can be implemented in connection with systems, such as those illustrated and described above. Additionally, in the discussion that follows, some of the acts that are performed are depicted as being performed by a server/transmitter, and other acts are depicted as being performed by a client/receiver. Examples of server/transmitters and client/receivers are provided above.

Step 700 encrypts an initial content key using a public key of a client/receiver. Any suitable content key can be utilized with but one example being given above. Step 702 sends a root license containing the encrypted initial content key to a client/receiver. Any suitable method can be utilized to implement this step. In the discussion that follows, two specific examples that draw upon two different protocols are provided. It is to be appreciated and understood that these constitute examples and are not intended to limit application of the claimed subject matter to only the specific protocols that are described.

Step 704 receives the root license sent by the server/transmitter and step 706 decrypts the encrypted initial content key. In this example, this step is performed by using the client/receiver's private key to decrypt the encrypted initial content key.

Step 708 prepares a leaf license and encrypts a new content key with the initial content key. Step 710 sends the leaf license to the client/receiver. Recall that the leaf license can and typically does contain policies and policy updates for DRM-protected content. It should be understood and appreciated that steps 708 and 710 can be executed multiple times for a given piece of DRM-protected content. That is, as the policies change with regard to a particular piece of DRM-protected content, a corresponding leaf license can be prepared and sent to the client/receiver.

Step 712 receives the leaf license and step 714 decrypts the new content key using the initial content key that was previously received. Step 716 then uses the decrypted new content key to decrypt content and update policies that are contained in the leaf license.

It is to be appreciated and understood that steps 712, 714 and 716 can be performed for each new leaf license that is received by the client/receiver.

Delivering Updated Policies Using HTTP

Having now discussed the notion of a root and leaf license and how each can be employed in the contexts described above, consider now how the root and leaf license can be delivered using HTTP.

When HTTP is utilized for carrying DRM-protected content, the client issues two requests to the server/transmitter. First, the client issues a POST request to retrieve a root license. Second, the client issues a GET request for retrieving the DRM-protected content. The client issues the requests in this example because in HTTP, the server typically cannot initiate communication with a client.

Figure 8:
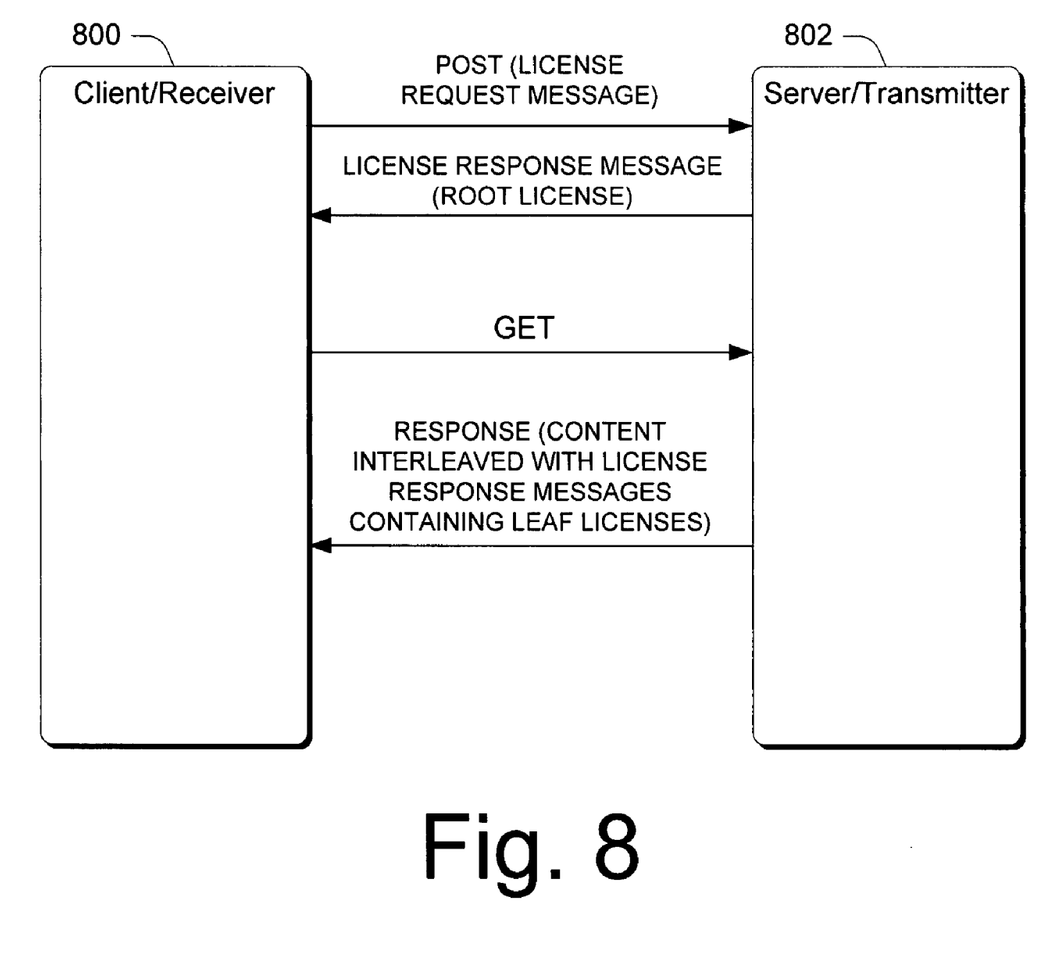
FIG. 8 illustrates the communication of root and leaf licenses in accordance with one embodiment.

Specifically, consider FIG. 8 in connection with the following discussion. When a client wishes to receive a root license, it issues a POST request to the server. The POST request contains a license request message, as discussed above. Responsive to receiving this communication, the server responds with a license response message that contains a root license which, in at least one embodiment, is expressed in XMR. Having received the root license and processed it accordingly, the client issues a GET request to the server asking for the DRM-protected content. Responsive to the GET request, the server replies with segments of the requested content interleaved with one or more license response messages. The license response messages each contain a leaf license that pertains to a particular portion of the DRM-protected content. Any suitable mechanism or interleaving technique can be used for formulating the server's reply.

As but one implementation example in one particular context, consider the following.

In but one example, a four-byte framing header is used to encapsulate data and control blocks. The framing header contains a one byte ASCII dollar sign (0x24), followed by a one byte block type identifier, followed by a two byte length of the encapsulated data, represented in network byte order.

| Sections | Fields |
|---|---|
| Header | 8-bit ASCII dollar sign (0x24) |
|  | 8-bit Block Type |
| Data Length | 16-bit Length of the encapsulated data |

A Control block uses an ASCII 'c' character (0×63) as its type identifier. This block contains a message, typically a License Response message.

A Data block uses an ASCII 'd' character (0×63) as its type identifier. This block contains a Data Segment descriptor immediately followed by media data.

The Data Segment descriptor can be associated with content that is encrypted or in the clear. An encrypted flag in the descriptor conveys this information. A Data Segment descriptor is associated with a portion of the transmitted file to which, if encrypted, a single policy and content encryption key apply. In other words, the content encryption key and policies cannot be changed within the segment.

In accordance with one embodiment, a typical HTTP response with link encryption is comprised of the following blocks:

1. Control block [$c] carrying a License Response message with a Chained License.
2. One or more Data blocks [$d].

In case there is a key or policy change during the transmission of the file, then the following steps are added:

3. A new Control block [$c] carrying a License Response message with a new Chained License.
4. One or more Data blocks [$d].

Note that steps 3 and 4 may occur multiple times in the case of multiple key or policy changes.

Using RTSP To Carry Root and Leaf Licenses

Having now discussed the notion of a root and leaf license and how each can be delivered using HTTP, consider now how the root and leaf license can be delivered using RTSP.

One of the differences between RTSP and HTTP is that RTSP is significantly more sophisticated than HTTP. Specifically, RTSP has provisions for server-initiated requests, which allow the server to send commands to the client at any time. In accordance with this embodiment, consider the following in connection with FIG. 9.

Figure 9:
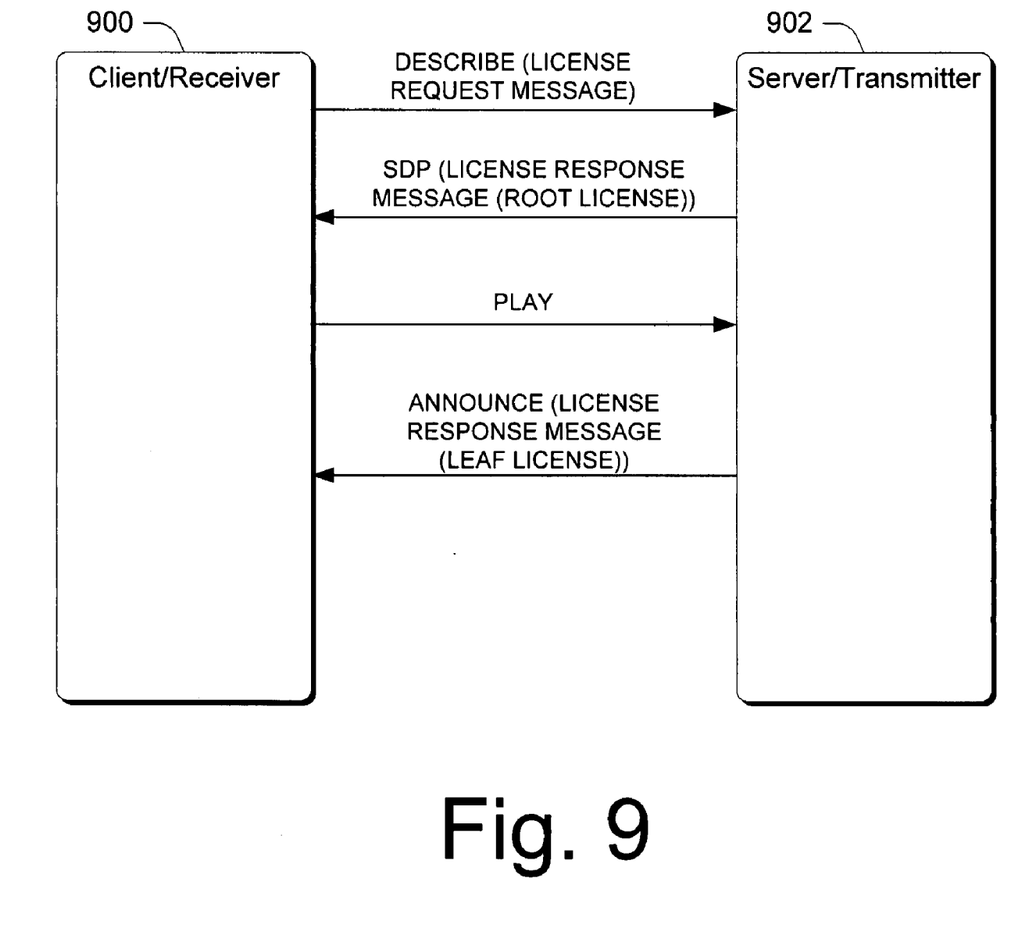
FIG. 9 illustrates the communication of root and leaf licenses in accordance with one embodiment.

When client/receiver wishes to play DRM-protected content, the client sends a DESCRIBE request containing a license request message. Responsive to receiving this message, the server responds with a SESSION DESCRIPTION PROTOCOL (SDP) that embeds a license response message. The license response message contains a root license which, in this particular embodiment, is expressed in XMR.

Now, when the client wishes to receive DRM-protected content, the client sends a PLAY request to the server to start the stream. At any appropriate time, the server can send an ANNOUNCE request to the client carrying a license response message that contains a leaf license.

As an implementation example, consider the following. Consider first the DESCRIBE request excerpt just below which incorporates a License Request Message in accordance with one embodiment.

```
DESCRIBE rtsp://eduardo01/file.wmv RTSP/1.0
Accept: application/sdp
CSeq: 1
Supported:   com.microsoft.wmdrm-nd, com.microsoft.wm.eosmsg,
    method.announce
Require: com.microsoft.wmdrm-nd
```

```
Content-Type: application/vnd.ms-wmdrm-license-request
Content-Length: 1078
License_Request_Message
```

The "Require: com.microsoft.wmdrm-nd" is used, in this example, to indicate that the receiver expects the server to be a particular type of transmitter. The "Content-Type: application/vnd.ms-wmdrm-license-request" is used, in this example, to indicate that the body of the DESCRIBE contains a License Request Message.

Unless there is an error, the transmitter should reply with an SDP description which includes the License Response Message described in the section immediately below.

Having received a DESCRIBE request that contains, in the body, a License Request Message, the server can return a License Response Message. In this example, the server returns an SDP description that not only contains the various parameters described before, but also the License Response Message. In this embodiment, the License Response Message, as previously indicated, will carry an XMR license that dictates which policies apply to the content.

As but one implementation example, consider the SDP excerpt just below which incorporates a License Response Message in accordance with one embodiment.

```
RTSP/1.0 200 OK
Last-Modified: Thu, 19 Dec 2002 15:36:18 GMT
Content-Length: 1891
Content-Type: application/sdp
CSeq: 1
Supported:    com.microsoft.wmdrm-nd, com.microsoft.wm.eosmsg,
       method.announce
SDP_Description
```

The license returned corresponds to a Root License, which will be used for the duration of the session. The specific Leaf Licenses are returned at a later time via ANNOUNCE requests described below.

In accordance with one embodiment, the SDP returned by the transmitter includes the License Response Message encoded in a data URL according to the specification in RFC-2397 (http://www.ietf.org/rfc/rfc2397.txt). The data contained in the data URL, in this example, must be Base64 encoded and the MIME type must be set to "application/vnd.ms-wmdrm-license-response".

As an example of the syntax, consider the following:

Consider now the use of ANNOUNCE requests to deliver updated policies in the middle of a stream. Specifically, the ANNOUNCE request excerpt just below illustrates how a leaf license can be delivered in accordance with one embodiment.

```
ANNOUNCE rtsp://eduardo01/file.wmv RTSP/1.0
CSeq: 27
Session: 8322364901836665746
Supported:    com.microsoft.wmdrm-nd, com.microsoft.wm.eosmsg,
       method.announce
Require: method.announce
Event-Type: 4000 wmdrm-nd-message
Content-Type: application/vnd.ms-wmdrm-license-response
Content-Length: 924
License_Response_Message
```

The "Content-Type: application/vnd.ms-wmdrm-license-response" header must be used, in this example, to indicate that the body of the request contains a License Response message. The "Event-Type: 4000 wmdrm-nd-message" header must be used, in this example, to indicate that this is an event that carries a WMDRM-ND message. The receiver should process the License Response message ensuring that the Rights ID matches the one in the License Request. Unless there is an error, the receiver must return a 200 OK response to the transmitter, such as that shown just below.

```
RTSP/1.0 200 OK
CSeq: 27
Session: 8322364901836665746
Supported:    com.microsoft.wmdrm-nd, com.microsoft.wm.eosmsg,
       method.announce
```

Notice that since the License returned in the DESCRIBE request corresponds to a root license. The transmitter must deliver the leaf license that will allow the receiver to decrypt the content prior to initiating data delivery. This means that immediately after the receiver sends the first PLAY request, the transmitter is responsible for sending the Leaf License in an ANNOUNCE request before starting the data flow.

There is no strict relationship between the moment at which the transmitter delivers the ANNOUNCE message and the new License is required to decrypt content. This means that a transmitter can deliver the ANNOUNCE before or even after it starts delivering packets that contain associated protected content. One method that can be employed to carry protected content is through the use of RTP packets, as will be appreciated by the skilled artisan.

```
data:application/vnd.ms-wmdrm-license-response;base64,
AggAAAAAAABOFhNUgAAAAAB+TTbzXCRw1s+/jA4fQQY0wADAAEAAAEgAAMAAgAAADwAAQAD
AAAAEgBkAAAAAAAAAAAAAQAMAAAAGKRuHVtxsJ1Lk7WPrQPe5X0AAQANAAAACgABAAMABAAA
ABoAAQAFAAAAEgBkAGQAZABkAGQAAwAJAAAApgABAAoAAACeajiAiUBMGrAGUAOIqMGBggAB
AAEAgC7V1QF54EzuYbTYKPbgBEK6nDXGtbV+bJKF+Cn2yd/FUaC4vTIOxkF/eQLx+FqvLCUM
txvRSw01dns9Ejt021se2T+IROiZA0t5pRuN13gq7JK9JKs+ZX8hKsEJFW0V7cyp9wdaCMh2
esJ97r9agH1Sxf0mAqcQ0j1Q5dtX1Wx/AAEACwAAABwAAQAQZZaX5nGEUAV8w6p6BQr++Q==
```

The data URL, in this example, must be inserted at the SDP session level using a "a=key-mgmt" attribute, according to the SDP key management extensions specification, which continues to be a work in progress as of this date. The syntax is as follows:

a=key-mgmt:wmdrm-nd URL

The URL parameter is the data URL described above.

Conclusion

Various embodiments described above permit policy updates, such as DRM policy updates, to be delivered and updated for a given piece of protected content. In at least some embodiments, various protocols can be extended to permit policy updates to be represented and carried by the protocol.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
building a root license that contains an encrypted initial content key that is asymmetrically encrypted using a public key of an intended receiver, the root license pertaining to content in an audio and/or video content file that is to be streamed to the intended receiver and the public key of a larger bit size than the root license initial content key;
responsive to receipt of a license request from the intended receiver, sending the root license to the intended receiver;
preparing one or more leaf licenses that are chained to the root license, the one or more leaf licenses pertaining to updated policies associated with the streamed content in the content file, wherein the one or more leaf licenses individually contain a different content key that is symmetrically encrypted using the initial content key; and
responsive to receipt of a content request from the intended receiver or during streaming of protected content from the content file, sending the one or more leaf licenses to the intended receiver wherein the act of sending the one or more leaf licenses comprises interleaving portions of protected content with data that includes the one or more leaf licenses to thereby allow the intended receiver to consume the protected content in the content file by firstly asymmetrically decrypting the initial content key and successively symmetrically decrypting each content key of the one or more leaf licenses wherein a transmitter performs the sending of the one or more leaf licenses and sends each one of the one or more leaf licenses prior to sending a corresponding portion of protected content from the content file and wherein the intended receiver lacks knowledge of a number of leaf licenses to be sent by the transmitter.

2. The method of claim 1, wherein the initial content key comprises a 128-bit AES key.

3. The method of claim 1, wherein the different content key comprises a 128-bit AES key.

4. The method of claim 1, wherein the acts of sending the root license and the one or more leaf licenses are performed using HTTP.

5. The method of claim 1, wherein the acts of sending the root license and the one or more leaf licenses are performed using RTSP.

6. A computer-implemented method reliant on client initiated communication with a server via a HTTP protocol, the method comprising:
receiving an HTTP POST request, that contains a license request message, from an intended receiver that requests a root license for protected content in an audio and/or video content file that is to be streamed to a receiver wherein the root license contains an encrypted initial content key that is asymmetrically encrypted using a public key of the intended receiver, the root license pertaining to content in the content file that is to be streamed to the intended receiver and the public key of a larger bit size than the root license initial content key;
responsive to the receiving, sending the root license to the receiver in a license response message;
receiving an HTTP GET request from the intended receiver that requests protected content in the content file; and
responsive to the receiving an HTTP GET request, sending segments of requested protected content from the content file interleaved with data that includes one or more leaf licenses that are chained to the root license wherein the one or more leaf licenses individually contain a different content key that is symmetrically encrypted using the initial content key to thereby allow the intended receiver to consume the protected content from the content file by firstly asymmetrically decrypting the initial content key and successively symmetrically decrypting each content key of the one or more leaf licenses wherein the server performs the sending and sends each of the one or more leaf licenses in a respective license response message prior to sending a corresponding one of the segments of protected content from the content file and wherein the intended receiver lacks knowledge of a number of leaf licenses to be sent by the server.

7. A computer-implemented method reliant on server initiated communication with a client via an RTSP protocol, the method comprising:
receiving an RTSP DESCRIBE request from an intended receiver that requests a root license for protected content in an audio and/or video content file that is to be streamed to the intended receiver wherein the root license contains an encrypted initial content key that is asymmetrically encrypted using a public key of the intended receiver, the root license pertaining to content in the content file that is to be streamed to the intended receiver and the public key of a larger bit size than the root license initial content key;
sending the root license to the intended receiver;
responsive to receipt of a content play request from the intended receiver, to play the content in the content file, initiating a content stream to the intended receiver; and
sending one or more leaf licenses that are chained to the root license, wherein the sending one or more leaf licenses is performed during content streaming and interleaved with portions of protected content from the content file and wherein the one or more leaf licenses individually contain a different content key that is symmetrically encrypted using the initial content key to thereby allow the intended receiver to consume the protected content by firstly asymmetrically decrypting the initial content key and successively symmetrically decrypting each content key of the one or more leaf licenses wherein the server performs the sending and sends each of the one or more leaf licenses, respectively, in one or more RTSP ANNOUNCE requests prior to sending a corresponding portion of protected content from the content file and wherein each of the one or more RTSP ANNOUNCE requests individually contain a license response message and wherein the intended receiver lacks knowledge of a number of leaf licenses to be sent by the transmitter.

8. The method of claim 7, wherein the DESCRIBE request contains a license request message.

9. The method of claim 7, wherein the act of sending the root license comprises sending an RTSP SESSION DESCRIPTION PROTOCOL (SDP) that embeds a license response message that contains the root license.

10. The method of claim 7, wherein:
the DESCRIBE request contains a license request message; and the act of sending the root license comprises sending an RTSP SESSION DESCRIPTION PROTOCOL (SDP) that embeds a license response message that contains the root license.

11. The method of claim 7, wherein:

the DESCRIBE request contains a license request message; and
the act of sending the root license comprises sending an RTSP SESSION DESCRIPTION PROTOCOL (SDP) that embeds a license response message that contains the root license.

* * * * *